United States Patent [19]
Hisikura et al.

[11] Patent Number: 5,526,136
[45] Date of Patent: Jun. 11, 1996

[54] METHOD AND APPARATUS FOR REPRODUCING A VIDEO SIGNAL SUBJECT TO PRE-EMPHASIS

[75] Inventors: Hirofumi Hisikura, Yokosuka; Ryo Hirayama, Kamakura; Kaoru Kobayashi, Yokohama, all of Japan

[73] Assignee: Victor Company of Japan, Ltd., Yokohama, Japan

[21] Appl. No.: 170,030

[22] Filed: Dec. 20, 1993

[30]   Foreign Application Priority Data

Dec. 24, 1992 [JP] Japan ................................ 4-359258
Dec. 24, 1992 [JP] Japan ................................ 4-359260

[51] Int. Cl.⁶ ............................ H04N 5/76; H04N 5/213; H04N 5/78
[52] U.S. Cl. ........................ 358/335; 358/315; 358/312; 360/10.1; 348/613
[58] Field of Search ................................. 348/613, 607, 348/608; 358/335, 340, 310, 315, 312; 360/10.1, 33.1, 35.1; H04N 5/91, 5/92, 5/213, 9/64, 9/79, 5/76, 5/78

[56]   References Cited

U.S. PATENT DOCUMENTS

| | | | |
|---|---|---|---|
| 4,750,037 | 6/1988 | Kido et al. ............................ | 348/613 |
| 4,858,029 | 8/1989 | Ookawa . | |
| 5,130,858 | 7/1992 | Ebara et al. ......................... | 360/10.3 |
| 5,398,129 | 3/1995 | Reimann .............................. | 359/137 |

FOREIGN PATENT DOCUMENTS

| | | |
|---|---|---|
| 60-30296 | 2/1985 | Japan . |
| 1-296871 | 11/1989 | Japan . |
| WO82/00558 | 2/1982 | WIPO . |
| A-0190942 | 12/1987 | WIPO . |

OTHER PUBLICATIONS

Patent Abstract of Japan vol. 13, No. 277 (E-778) 26 Jun. 1989 and JP-A-01 064 480 (Nippon Hoso Kyokai NHK) 10 Mar. 1989.

Patent Abstract of Japan vol. 9, No. 147 (E-323) 21 Jun. 1985 and JP-A-60 028 387 (Olympus Kogaku Kogyo K.K.) 13 Feb. 1985.

Primary Examiner—Thai Q. Tran
Attorney, Agent, or Firm—Michael N. Meller

[57]   ABSTRACT

An image is stably reproduced in a special reproduction mode of still, frame advance or slow motion mode without residual image and/or blur. A video signal reproducing apparatus operates to alternately repeat the steps of interrupting a de-emphasizing process at a time at which the de-emphasis process for one video image signal period is completed, holding a content of a frame memory constituting the de-emphasis circuit without refreshing the content and performing a de-emphasis process based the content of the memory during a subsequent video image signal period.

3 Claims, 8 Drawing Sheets

FRAME ADVANCE

*Fig.5 (c)*
PRIOR ART

SLOW MOTION

METHOD AND APPARATUS FOR REPRODUCING A VIDEO SIGNAL SUBJECT TO PRE-EMPHASIS

BACKGROUND OF THE INVENTION

1. Field of the Invention

The present invention relates to a video signal reproduction apparatus for reproducing with de-emphasis a video signal subjected to pre-emphasis characteristics of which a level of high frequency components of the video signal is increased relative to low frequency components thereof in the time axis direction (time domain).

2. Description of the Prior Art

When a video signal is recorded on a recording medium such as magnetic tape, it has been usual, in order to minimize effect of noise in recording and reproducing operations or to improve an SN ratio, to record and reproduce the video signal by subjecting it to a frame emphasis so-called a temporal emphasis. That is, the video signal is recorded after frame pre-emphasis by which high frequency components of the video signal in time axis direction, are emphasized relative to low frequency components thereof every frame period and is reproduced with frame-de-emphasis which attenuates the high frequency components of a reproduced video signal relative to the low frequency components every frame period.

Figure 1:
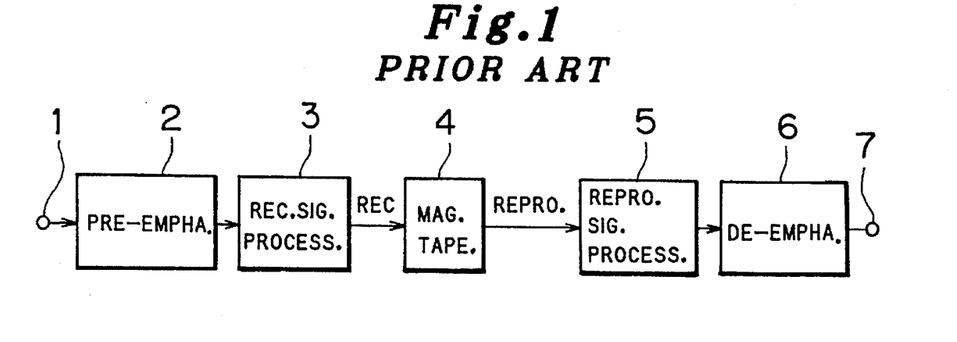
FIG. 1 is a block circuit diagram showing a basic construction of a conventional video signal recording and reproducing apparatus employing a frame emphasis.
Figure 2:
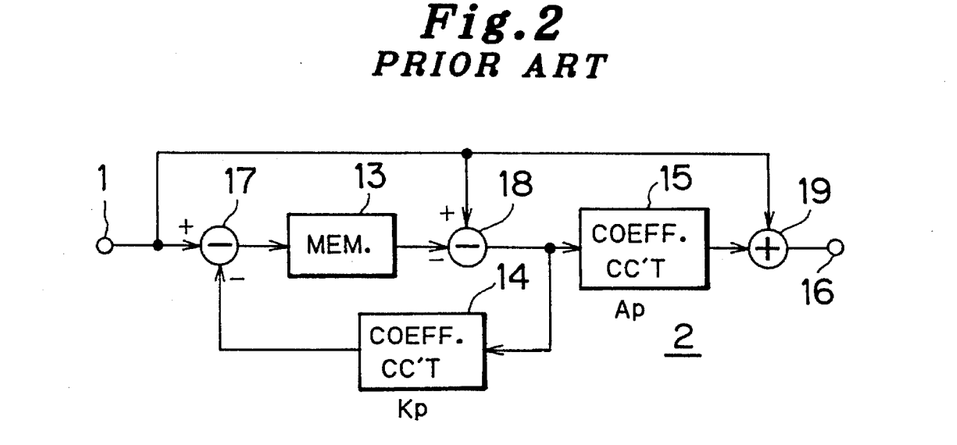
FIG. 2 is a circuit diagram of a conventional pre-emphasis circuit.
Figure 3:
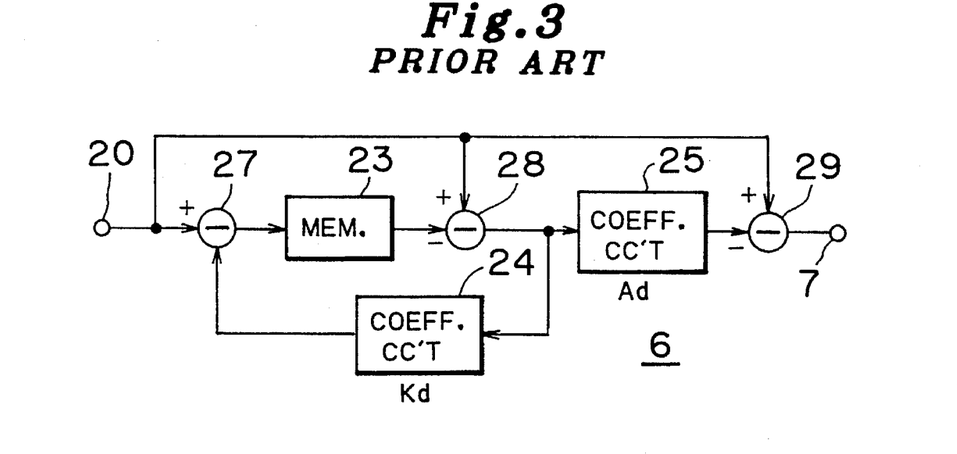
FIG. 3 is a circuit diagram of a conventional de-emphasis circuit.
Figure 4:
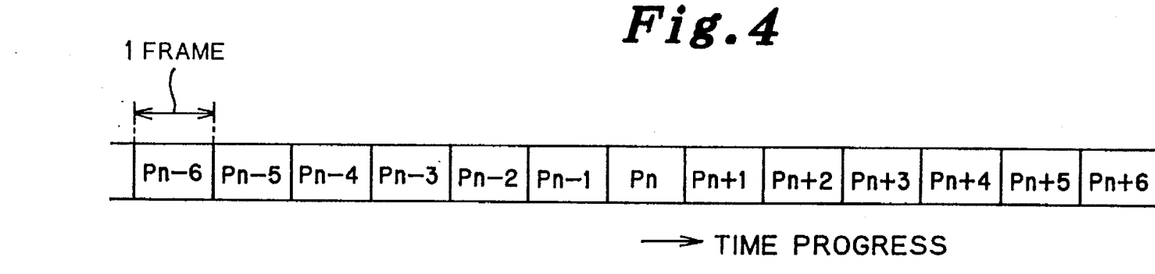
FIG. 4 explains a video signal recorded on a magnetic tape after undergoing a frame pre-emphasis.
Figure 5A:
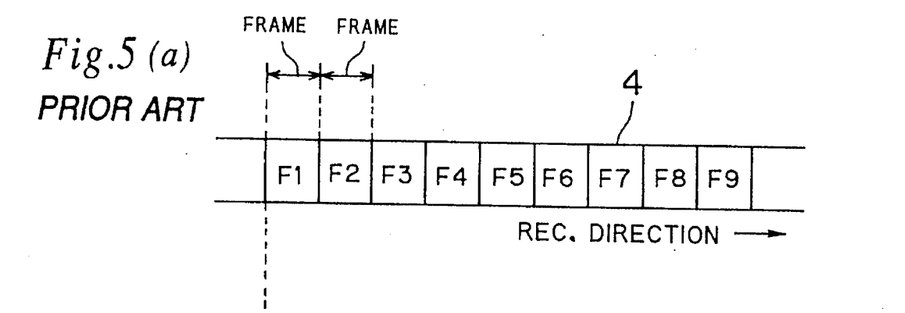
Figure 5B:
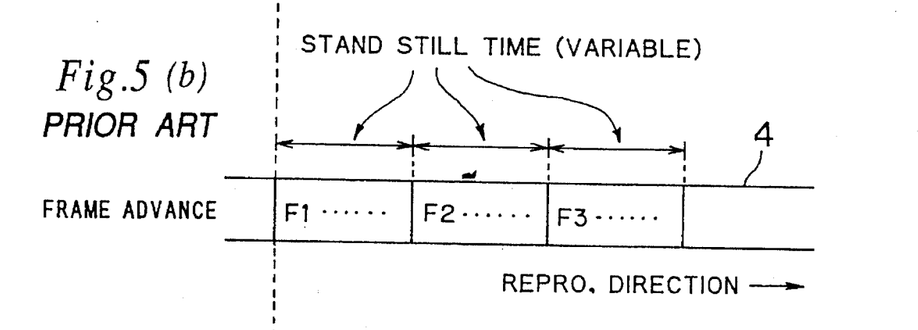
Figure 5C:
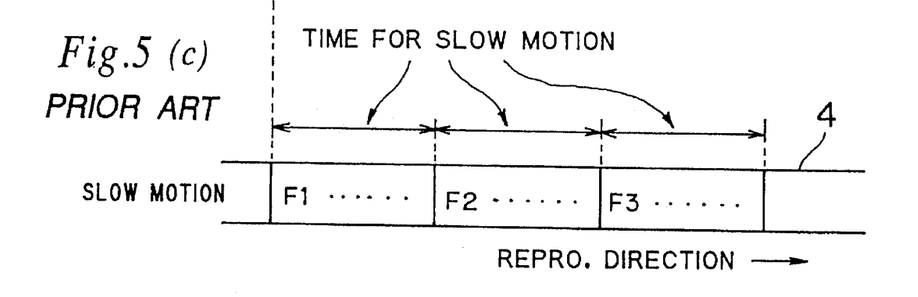

FIG. 1 shows a block circuit diagram of a video signal recording and reproducing apparatus which employs such frame emphasis, FIG. 2 shows a block circuit diagram of a pre-emphasis circuit, FIG. 3 is a block circuit diagram of a de-emphasis circuit, FIG. 4 shows a video signal recorded on a magnetic tape after frame pre-emphasis is applied and FIG. 5 explains a special reproduction of the video signal which is recorded on the magnetic tape after the frame pre-emphasis is applied.

In the video signal recording and reproducing apparatus shown in FIG. 1, a video signal inputted to an input terminal 1' is supplied to a pre-emphasis circuit 2 and a frame pre-emphasized video signal is supplied to a recording signal processing circuit 3 in which the video signal is suitably processed by such as frequency modulation, etc. The video signal thus processed by the recording signal processing circuit 3 is supplied through a recording amplifier (not shown), etc., to a magnetic head (not shown) by which the signal is recorded on a magnetic tape 4.

In the reproduction thereof, on the other hand, the recorded video signal on the magnetic tape 4 is reproduced by a magnetic head (not shown). After being amplified by a reproduction amplifier (not shown), the reproduced signal is processed in a reproducing signal processing circuit 6 in a reverse manner to the recording signal processing, and is supplied to a de-emphasis circuit 5 in which the reproduced video signal is frame de-emphasized, and subsequently, the frame de-emphasized reproduced signal is derived from an output terminal 7.

The pre-emphasis circuit 2 is constituted with a frame memory 13, coefficient circuits 14 and 15 having coefficients Kp and hp respectively, subtractor circuits 17 and 18 and an adder circuit 19, as shown in FIG. 2.

The de-emphasis circuit 6 is constituted with a frame memory 23, coefficient circuits 24 and 25 having coefficients Kd and Ad respectively, and subtractor circuits 27, 28 and 29, as shown in FIG. 3.

The frame pre-emphasis characteristics of the pre-emphasis circuit 2 becomes inverted with respect to the frame de-emphasis characteristics of the de-emphasis circuit 6, that is, a product of their transfer functions becomes 1, by selecting the coefficients Kp, Ap, Kd and Ad as follow:

Kp=0.422, Ap=2.11
Kd=0.679, Ad=0.566

In this case, the transfer function between the input terminal and the output terminal of the video signal recording and reproducing apparatus shown in FIG. 1 coincides with the transfer function without frame pre-emphasis and frame de-emphasis since the frame pre-emphasis characteristics and frame de-emphasis characteristics thereof are cancelled out each other.

Therefore, the reproduced video signal is not affected by the frame emphasis and thus the reproduced video signal at the output terminal 7 is the same as the signal without frame emphasis.

Since the above mentioned frame de-emphasis functions in the same manner as that of the well known frame recursive noise reducer, noise appearing during recording on the magnetic tape 4 is suppressed.

The frame emphasis operation will be described on a recording format on the magnetic tape 4.

When a video signal is recorded by means of the video signal recording and reproducing apparatus shown in FIG. 1, it is arranged on the magnetic tape 4 in sequence of frames as shown in FIG. 4.

Since, in the frame pre-emphasis processing, there is a feedback loop which bridges two adjacent frames as shown in FIG. 2, an influence of the frame pre-emphasis will appear between the adjacent frames. For example, a frame Pn in FIG. 4 contains information of the frame Pn-1 and frames preceding the latter.

When this magnetic tape is reproduced, these frames are reproduced in time sequence. Therefore, when the frame de-emphasis is performed on the frame Pn, it is impossible to frame de-emphasize the frame Pn alone since the information of the frame Pn-1 and the preceding frames have been stored in the frame memory 23.

There presents problems when a special mode reproduction is performed on the signal recorded on the magnetic tape with a frame emphasis, if the reproduced signal undergoes a frame de-emphasis for a normal mode reproduction.

Modes of such special reproduction may include a still (picture) reproduction, a frame (picture frame) advance reproduction or a slow motion reproduction. These special reproductions will be described with reference to FIGS. 5(a) to 5(c), which show video signals recorded on the magnetic tape 4 after being subjected to a frame pre-emphasized operational process in the frame order of F1, F2, F3, F4, F5, . . . , respectively.

(1) Still Reproduction

When the frame F1 on the magnetic tape 4 in FIG. 5(a) is still-reproduced by repeatedly reproducing the same frame (or the field), the frame de-emphasis is repeated for the same frame (or the field).

Therefore, in this case, the frame emphasis applied in the recording is not cancelled out (not properly complemented) by the frame de-emphasis in the reproduction, as a result, a reproduced video signal of the frame F1 underwent the pre-emphasis only is outputted, which provides an irregular image on a screen.

(2) Frame Advance and Slow Motion Reproductions

When the frame F1 shown in FIGS. 5(b) and 5(c) is reproduced in the frame-advance or the slow motion, a reproducing period of the frame F1 is extended longer than that in the normal reproduction.

Therefore, during this extended time period, the same frame (or the field) undergoes frame de-emphasis repeatedly.

Therefore, in this case, the frame emphasis applied in the recording is not cancelled out (not properly complemented) by the frame de-emphasis in the reproduction, causing that a reproduced video signal of the frame F1 underwent the pre-emphasis only is outputted, resulting in irregular image.

Further, when the subsequent frame F2 is reproduced in the frame advance or the slow motion mode, the frame de-emphasis operational process is performed in the order of frames F1, F1, F1, . . . , F2 while the frame pre-emphasis in the recording is performed in the order of frame F1, F2, . . . Therefore, operational process becomes no longer corresponding between the pre-emphasis and the de-emphasis resulting in a reproduced image having residual image or blur.

SUMMARY OF THE INVENTION

In order to solve these problems, the present invention provides a video signal reproducing apparatus constructed as follows.

A video signal reproducing apparatus includes a de-emphasis circuit for de-emphasizing a video signal pre-emphasized to emphasize a level of a high frequency component in time axis direction (time domain) relatively to a low frequency component thereof, and characterized by that a reproducing operation is performed by alternately repeating the steps of interrupting a de-emphasis process at a time at which a de-emphasis for 1 video image period is completed, holding a content of a memory constituting the de-emphasis circuit without refreshing and de-emphasizing the content of the memory in a next video image signal period.

A video signal reproducing apparatus comprises a de-emphasis circuit including a first memory, for de-emphasizing a video signal pre-emphasized to emphasizing a level of a high frequency component in time axis direction (time domain) relatively to a low frequency component thereof, a second memory for storing a de-emphasized video signal for 1 video image period, and a switch for selectively outputting an output of the de-emphasis circuit and an output of the second memory, characterized by that a special reproducing operation is performed by alternately repeating the steps of interrupting a de-emphasizing processing at a time at which the de-emphasizing processing for 1 video image period is completed, holding a content of the first memory without refreshing, outputting the reproduced video signal written in the second memory during the 1 video image period and outputting the reproduced video signal from the de-emphasis circuit during the de-emphasis processing of the 1 video image period.

BRIEF DESCRIPTION OF THE DRAWINGS

FIGS. 5(*a*), (*b*) and (*c*) explains a special reproduction of the video signal recorded on the magnetic tape after undergoing a frame pre-emphasis;

FIGS. 9(*a*), (*b*) and (*c*) is an illustration for explaining a moving of a magnetic head, reproduced FM envelope and switching signals during a slow motion reproduction at a speed of ¼;

DETAILED DESCRIPTION OF THE PREFERRED EMBODIMENTS

A video signal reproducing apparatus according to the present invention will be described with reference to FIGS. 6 to 11.

[First Embodiment]

Figure 6:
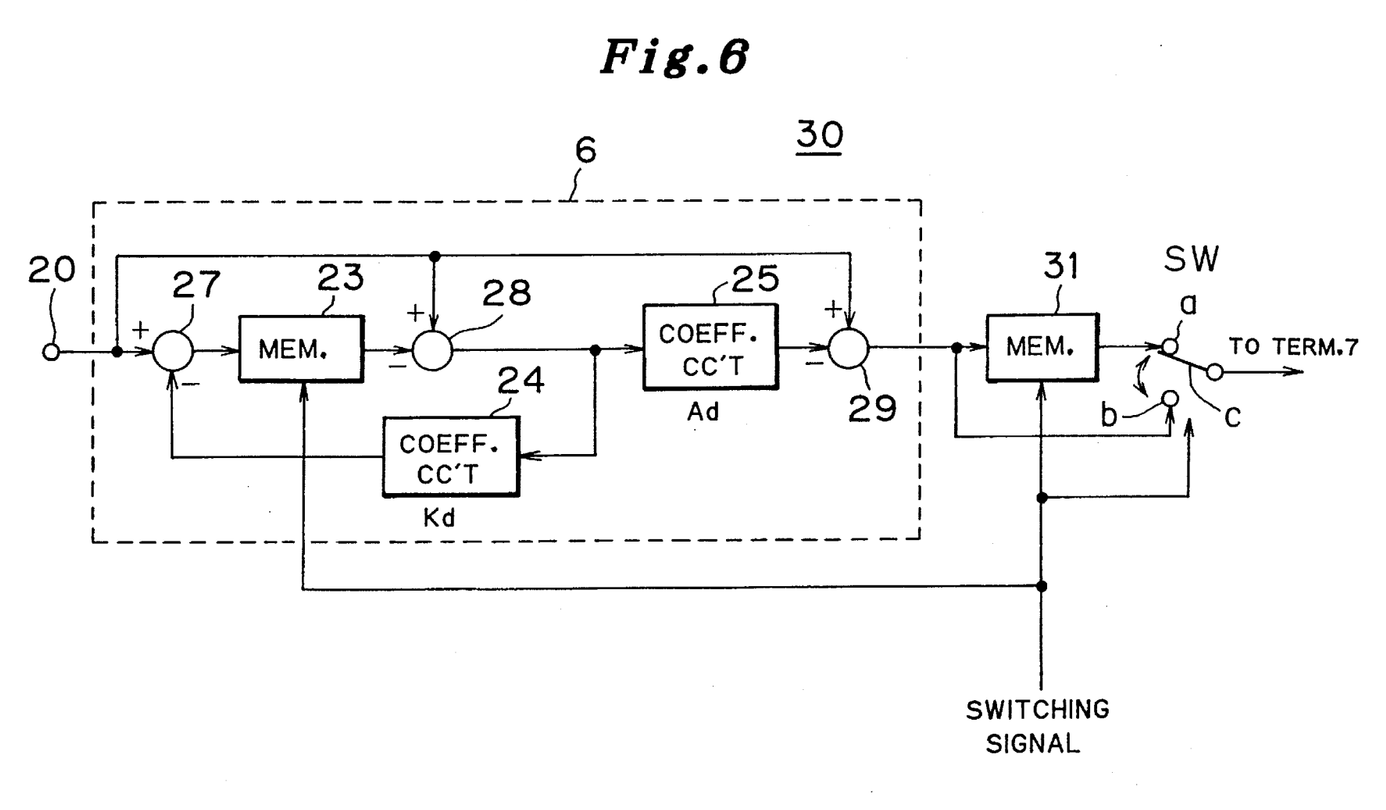
FIG. 6 is a block circuit diagram of a de-emphasis circuit and a peripheral circuit thereof which constitute a main portion of a video signal reproducing apparatus according to a first embodiment of the present invention.
Figure 7:
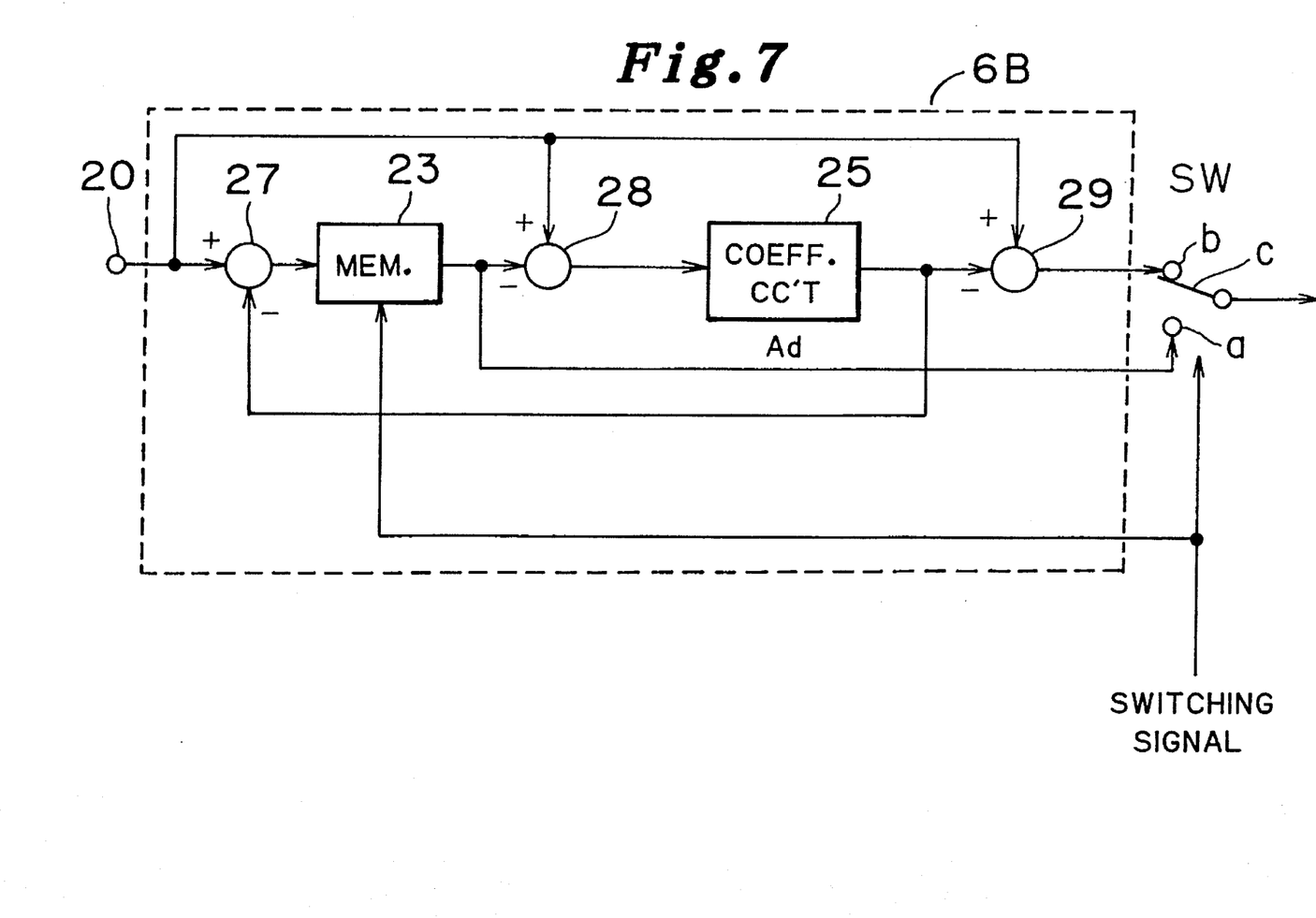
FIG. 7 is a block circuit diagram of a de-emphasis circuit and a peripheral circuit thereof which constitute a main portion of a video signal reproducing apparatus according to a second embodiment of the present invention.
Figure 8:
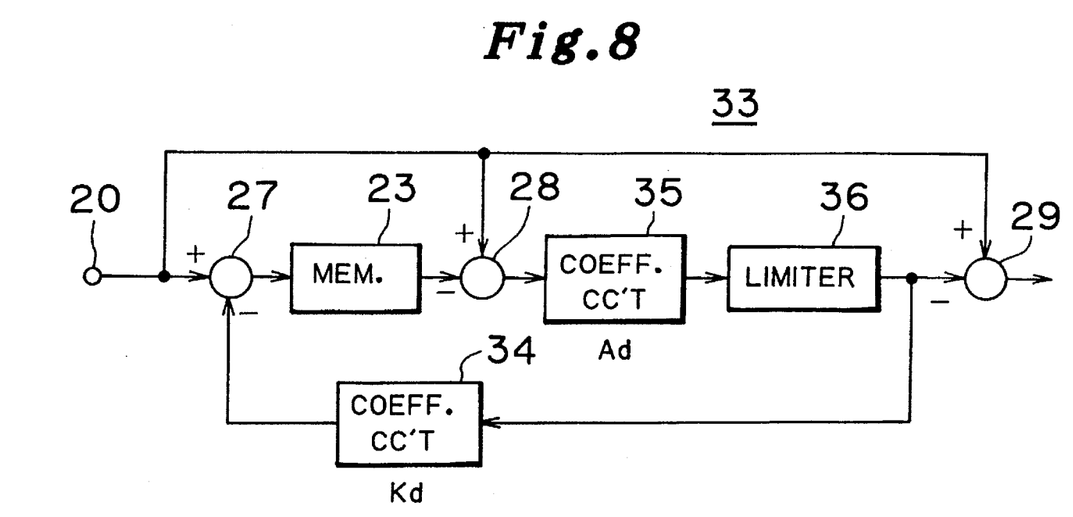
FIG. 8 is a circuit diagram of a non-linear frame de-emphasis circuit.
Figure 9:
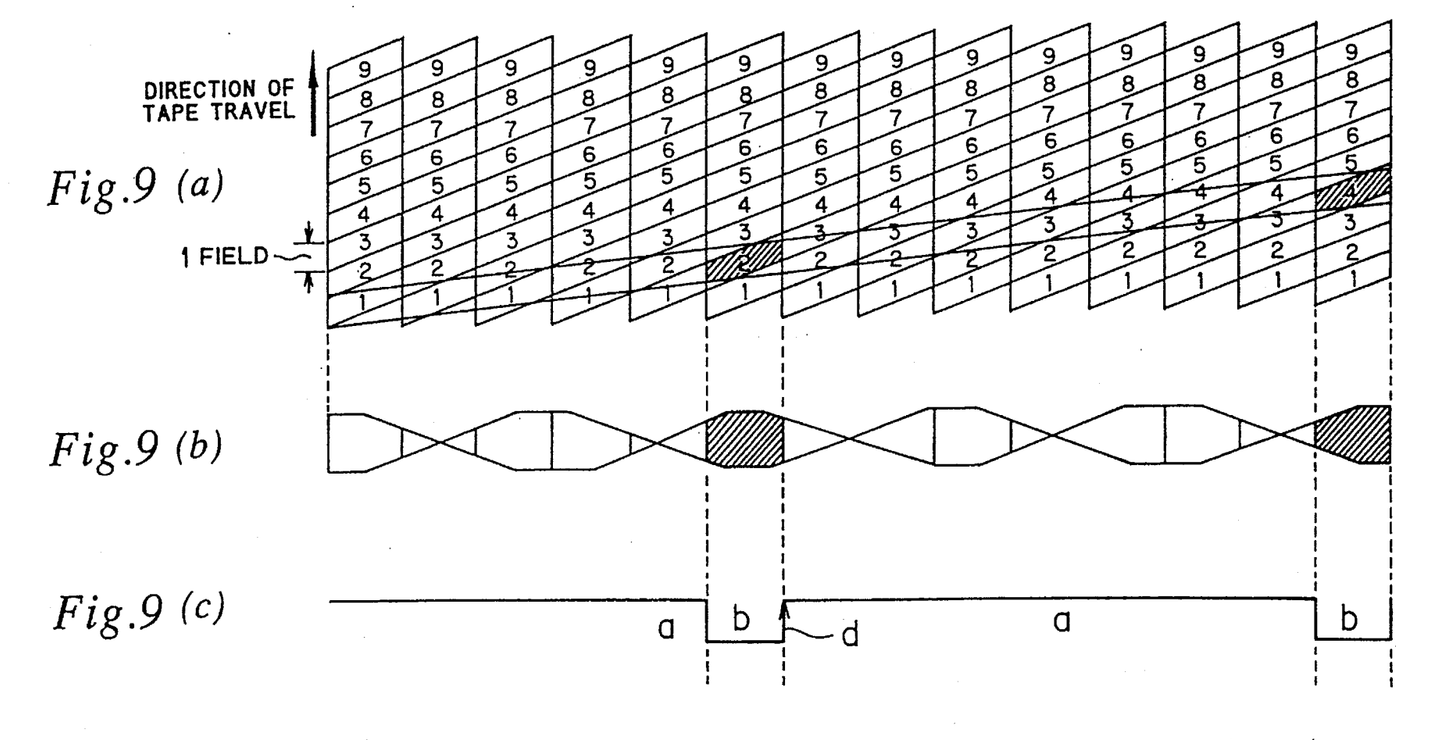
Figure 10:
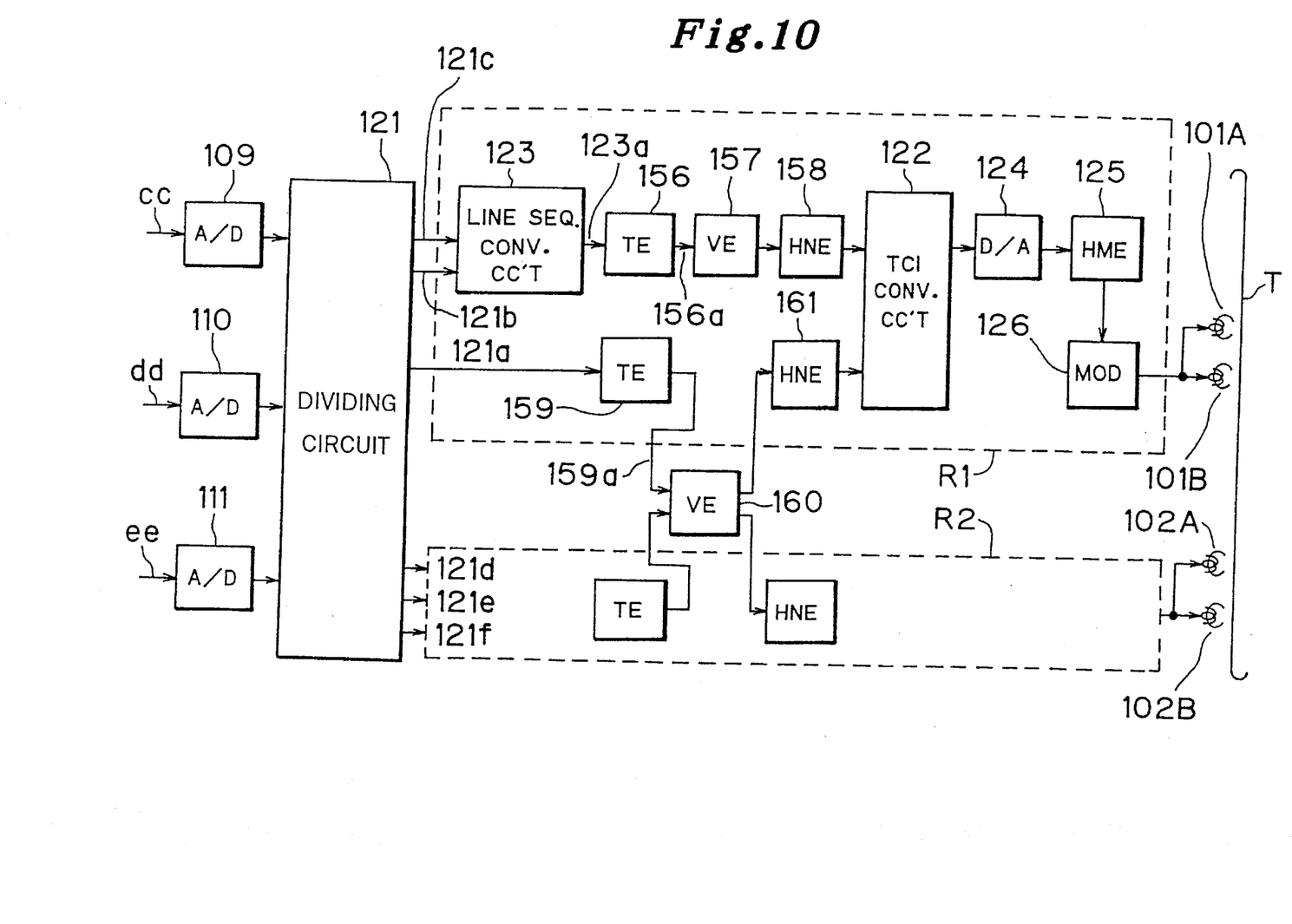
FIG. 10 is a block circuit diagram of a magnetic recording apparatus according to a third embodiment of the present invention.
Figure 11:
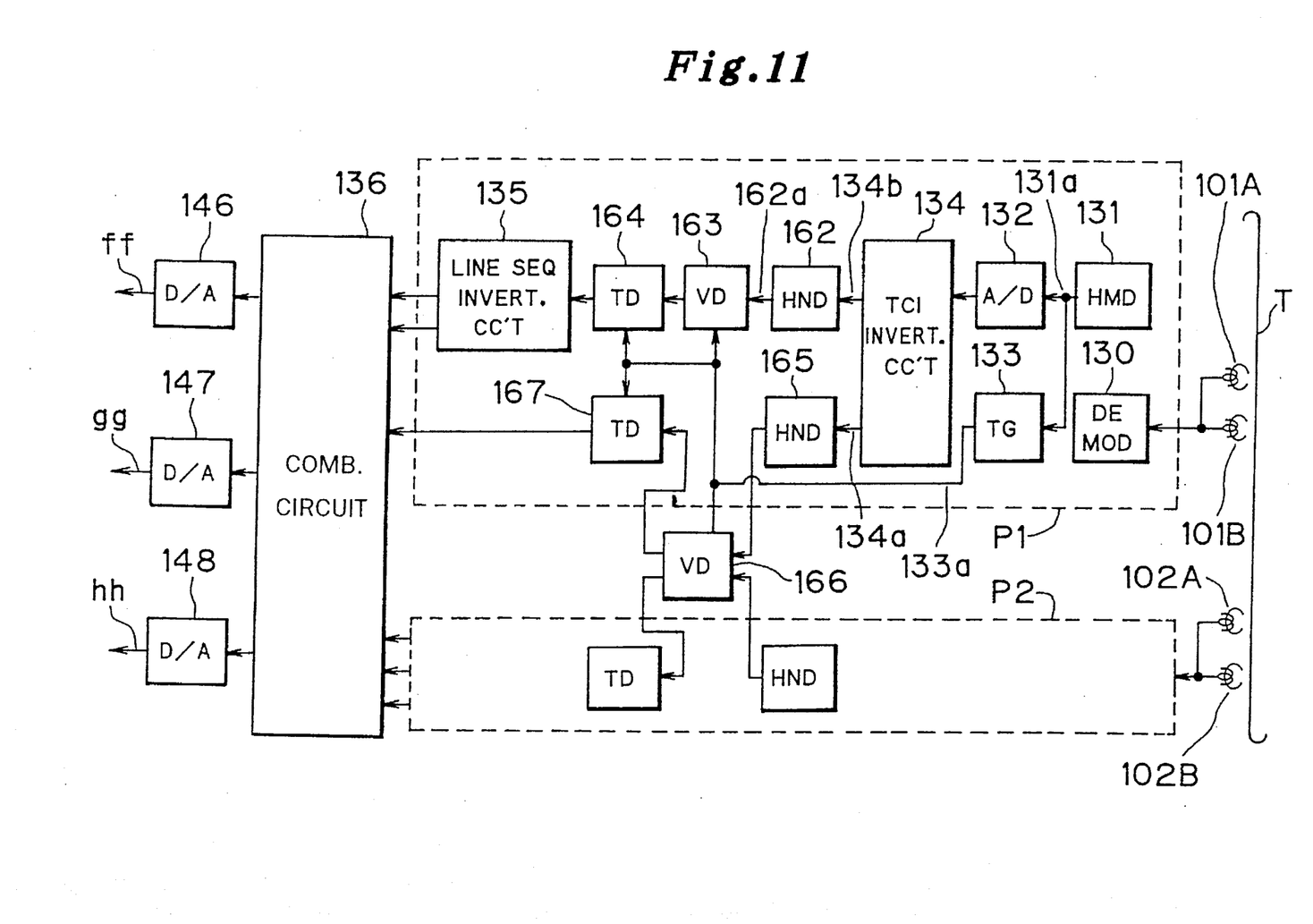
FIG. 11 is a block circuit diagram of a magnetic reproducing apparatus according to the third embodiment of the present invention.

FIG. 6 is a block circuit diagram of a de-emphasis circuit and a peripheral circuit thereof which constitute a main portion of a video signal reproducing apparatus according to a first embodiment of the present invention, FIG. 7 is a block circuit diagram of a de-emphasis circuit and a peripheral circuit thereof which constitute a main portion of a video signal reproducing apparatus according to a second embodiment of the present invention, FIG. 8 is a circuit diagram of a non-linear frame de-emphasis circuit, FIG. 9 is an illustration for explaining a moving of a magnetic head, reproduced FM envelope and switching signals during a slow motion reproduction at a speed of ¼, FIG. 10 is a block circuit diagram of a magnetic recording apparatus according to a third embodiment of the present invention and FIG. 11 is a block circuit diagram of a magnetic reproducing apparatus according to a third embodiment of the present invention.

In these figures, same components as those described previously are depicted by same reference numerals without detailed description thereof.

The video signal reproducing apparatus according to the present invention performs repeatedly and alternately a sequence of reproducing operation as such that the operation interrupts a de-emphasizing processing upon completion of one frame or field (video image period) period of the processing, then by holding a content of a frame memory 23 which constitutes a de-emphasis circuit 6, without refreshing the content, performs a de-emphasizing process in the subsequent video image period on the basis of the content of the memory 23.

Further, the video signal reproducing apparatus according to the present invention comprises a reproducing signal processing circuit 5 described previously, the de-emphasis circuit 6, a memory 31 connected to an output of the de-emphasis circuit 6 and a switch SW for selectively outputting an output of the de-emphasis circuit 6 and an output of the memory 31.

During the reproduction, the video signal recorded on the magnetic tape 4 is reproduced through the magnetic head (not shown) and supplied to the de-emphasis circuit 6 including the frame memory 31 and the switch SW after processing it in a reverse manner to the signal processing during recording operation by means of a reproducing amplifier (not shown) and the reproducing signal processing circuit 5, resulting in a reproduced video signal derived from an output terminal 7 being frame de-emphasized suitably for the special reproduction.

The de-emphasis circuit 6 is constituted with a frame memory 23, coefficient circuits 24 and 25 having coefficients Kd and Ad respectively, and subtractor circuits 27, 28 and 29, as shown in FIG. 6.

An output of the de-emphasis circuit 6, that is, an output of the subtractor circuit 29, is connected to an input of the frame memory 31 and to terminals "a" and "b" of the switch SW which further includes a movable contact "c".

The terminal "a" of the switch SW is connected to an output of the frame memory 31 and the movable contact "c" thereof is connected to the output terminal 7.

The switch SW is switched in response to a switching signal having a state which is switched from a first state to a second state within a period for which a complete reproduced FM envelope output shown in FIG. 9(*b*) is obtained.

That is, as shown in FIG. 9(*c*), during a period for which the switching signal is in an L level, the movable contact "c" of the switch SW is connected to the terminal "b" and, during the switching signal is in an H level, the movable contact "c" is connected to the terminal "a".

The frame memory 31 is switched between a write mode and a read mode also by this switching signal. During the switching signal is in the L level, the frame memory 31 is written with the reproduced, frame de-emphasized video signal output from the de-emphasis circuit 6 and, during the switching signal is in the H level, the video signal stored therein is read out and fed to the terminal "a" of the switch SW.

(1) Still Picture Reproduction

Frame de-emphasis processing for still picture reproduction with the circuit configuration shown in FIG. 6 is now explained.

During still picture reproduction of the frame F1 on the magnetic tape 4 shown in FIG. 5(*a*), the de-emphasis processing is interrupted at a time point at which the frame de-emphasis processing for one normal frame reproduction period (L level period of the switching signal shown in FIG. 9(*c*)) is completed, that is, at a leading edge "d" of the switching signal shown in FIG. 9(*c*), and the content of the frame memory 23 of the de-emphasis circuit 6 is held as it is without being refreshed. It is determined that the time period for which the content of the frame memory 23 is held as it is equal to a time period for which the frame F1 is presented as a still picture reproduction.

In this case, the frame de-emphasized video signal which has been written in the frame memory 31 during the L level period the switching signal shown in FIG. 9(*c*) is held in the same memory 31. The final video signal stored in the frame memory 31 is read out and outputted to the output terminal 7.

As a result, a repetitive frame de-emphasis performed on the same frames is avoided, resulting in a normal reproduced image.

(2) Frame Advance and Slow Motion Reproduction

Frame de-emphasis processing in the frame advance mode or in the slow motion modes with the circuit configuration shown in FIG. 6 is now explained.

During the reproduction in the frame advance mode or in the slow motion mode of the frame F1 recorded on the magnetic tape 4 shown in FIG. 5(*b*) or 5(*c*), the frame de-emphasis is interrupted at a time point at which the frame de-emphasis for one normal frame reproduction period is completed, that is, at the leading edge "d" of the switching signal in the L level shown in FIG. 9(*c*), and the content of the frame memory 23 of the de-emphasis circuit 6 is held as it is without being refreshed for a time period during which the frame F1 is presented as a picture in the frame advance mode or in the slow motion mode.

During this time period, the frame de-emphasized video signal which has been written during the L level period of the switching signal shown in FIG. 9(*c*) is held in the frame memory 31.

Since the switch SW switches its movable contact "c" to the terminal "a" at the leading edge "d" of the switching signal, the video signal stored in the frame memory 31 is read out to the output terminal 7.

As a result, repetitive frame de-emphasis performed on the same frame is avoided, resulting in a normal reproduced image.

When the subsequent frame F2 is reproduced in the frame advance or the slow motion mode as shown in FIG. 5(*b*) or 5(*c*), de-emphasis is started again on the basis of the content of the frame memory 23 which is the frame F1 held during the reproduction in the frame advance or the slow motion mode. With this scheme, the frame de-emphasis during the reproduction coincides with the frame pre-emphasis during the recording, resulting in a reproduced image having no residual image or blur.

When a special reproduction such as reproduction in the still, the frame advance or the slow motion mode is performed by tracking only field tracks with a specific one of the pair of heads in a VTR of 2-head helical scan type, the frame memories 23 and 31 of this embodiment can be replaced with field memories as well with similar effects.

[Second Embodiment]

Although two frame memories 23 and 31 are used in the circuit construction 30 shown in FIG. 6, it is possible to reduce the number of coefficient circuits as well as the number of frame memories. If the coefficients Kd and Ad are made equal each other, the coefficient circuits 24 and 25 can be made to a single element i.e. the coefficient circuit 25 only, the same is true to the frame memories 23 and 31 having same memory capacity each other, thus can be a single frame memory 23 alone. This circuit configuration is now shown in FIG. 7, which is used on a second embodiment of the present invention.

That is, the second embodiment comprises the previously mentioned reproducing signal processing circuit 5, the de-emphasis circuit 6B and the switch SW connected to the output of the de-emphasis circuit 6B.

During reproduction, the video signal recorded on the magnetic tape 4 is reproduced with the magnetic heads (not shown) and supplied to the de-emphasis circuit 6B after processing it in reverse manner to the signal processing in the recording operation, by means of a reproducing amplifier (not shown) and the reproducing signal processing circuit 5, resulting in a reproduced video signal derived from an output terminal 7 being frame de-emphasized suitably for the special reproduction modes.

The de-emphasis circuit 6B is constituted with a frame memory 63, a coefficient circuit 25 having a coefficient Ad, and subtractor circuits 27, 28 and 29, as shown in FIG. 7.

An output of the memory 23 of the de-emphasis circuit 6B is connected to a terminal "a" of a switch SW and an output of the subtractor circuit 29 is connected to a terminal "b" of the switch SW which further includes a movable contact "c" connected to an output terminal 7.

The switch SW is switched by a switching signal having a state which is switched from a first state to a second state within a period in which a complete reproduced FM envelope output shown in FIG. 9(b) is obtained.

That is, as shown in FIG. 9(c), during a period in which the switching signal is in the L level, the movable contact "c" of the switch SW is connected to the terminal "b" and, during the switching signal is in the H level, the movable contact "c" is connected to the terminal "a".

The frame memory 23 is switched between a write mode and a read mode by this switching signal. During the switching signal is in the L level, the frame memory 23 is written with the reproduced, frame de-emphasized video signal outputted from the de-emphasis circuit 6 and, during the switching signal is in H the level, the video signal stored therein is read out and fed to the terminal "a" of the switch SW.

(1) Still Picture Reproduction

Frame De-emphasis during Still PictureReproduction with the circuit configuration shown in FIG. 7 is now described:

During still reproduction of the frame F1 on the magnetic tape 4 shown in FIG. 5(a), the de-emphasis processing is interrupted at a time point at which the frame de-emphasis for one normal reproduction frame period during the L level period in FIG. 9(c) is completed, that is, at a leading edge "d" of the switching signal shown in FIG. 9(c), and the content of the frame memory 23 processed of the frame de-emphasis, is not refreshed and kept in the frame memory 23 during the L level period of the switching signal shown in FIG. 9(c). In this period, the movable contact "c" of the switch SW is kept at the terminal "b".

As shown in FIG. 9(c), the switch SW switches its movable contact "c" to the terminal "a" at the leading edge "d" of the switching signal and thus the video signal stored in the frame memory 23 is read and outputted to the output terminal 7.

As a result, repetitive frame de-emphasis applied to the same frame is avoided, resulting in a normal reproduced image.

(2) Frame Advance and Slow Motion Reproduction

Frame De-emphasis during Reproduction in Frame Advance or Slow Motion Mode, using the circuit configuration shown in FIG. 7 is explained:

During reproduction in the frame advance mode or in the slow motion mode of the frame F1 on the magnetic tape 4 shown in FIG. 5(b) or 5(c), the frame de-emphasis is interrupted at a time point at which the frame de-emphasis processing for one normal reproduction frame period is completed, that is, at the leading edge "d" of the switching signal in the H level shown in FIG. 9(c). And the content of the frame memory 23 processed of the frame de-emphasis during the L level period of the switching signal shown in FIG. 9(c) is stored in the frame memory 23 without being refreshed. In this period, the movable contact "c" of the switch SW is kept at the terminal "b" thereof.

Since the switch SW switches its movable contact "c" to the terminal "a" at the leading edge "d" of the switching signal, the video signal stored in the frame memory 23 is read out to the output terminal 7. As a result, repetitive frame de-emphasis between the same frames is avoided, resulting in a normal reproduced image.

When the subsequent frame F2 is reproduced in the frame advance or the slow motion mode as shown in FIG. 5(b) or 5(c), the de-emphasis resumes on the basis of the content which is the frame F1 held in the frame memory 23. With this scheme, the operational process of the frame de-emphasis during the reproduction corresponds with that of the frame pre-emphasis during the recording, resulting in a reproduced images of no residual image or blur.

When a special reproduction such as reproduction in the still, the frame advance or the slow motion mode is performed by tracking only field tracks with a specific one of the pair of heads in a VTR of 2-head helical scan type, the frame memory 23 of this embodiment can be replaced with a field memory with similar effects.

Further, it is possible to obtain similar effects by replacing the de-emphasis circuit 6 shown in FIG. 6 or the de-emphasis circuit 6B shown in FIG. 7 with a non-linear frame de-emphasis circuit 33 shown in FIG. 8.

The non-linear frame de-emphasis circuit 33 in FIG. 8 is constituted with a frame memory 23, coefficient circuits 34 and 35 having coefficients Kd and Ad respectively, subtractor circuits 27, 28 and 29 and a limiter circuit 36.

When the non-linear frame de-emphasis circuit 33 is used instead of the de-emphasis circuit 6 shown in FIG. 6, an output of the subtractor circuit 29 is connected to an input of the frame memory 31 and to a terminal "b" of the switch SW which further includes a terminal "a" and a movable contact "c".

The terminal "a" of the switch SW is connected to an output of the frame memory 31 and the movable contact "c" thereof is connected to the output terminal 7.

When the non-linear frame de-emphasis circuit 33 shown in FIG. 8 replaces the de-emphasis circuit 6B shown in FIG. 7, an output of the memory 23 of the non-linear frame de-emphasis circuit 33 is connected to the terminal "a" of the switch SW and an output of the subtractor 29 is connected to the terminal "b" of the switch SW. The movable contact "c" of the switch SW is connected to the output terminal 7.

[Third Embodiment]

The third embodiment is featured by that the time axis de-emphasis described with respect to the first and second embodiments is applied to a magnetic recording and reproducing apparatus for magnetically recording and reproducing a high definition TV signal. The magnetic recording and reproducing apparatus according to the third embodiment receives, as input signals, a luminance signal (referred to as "Y" signal hereinafter) and a first and second color difference signals (referred to as "PB" and "PR" signals respectively) produced according to the Japanese High Definition TV standards. These input signals are separated into two signal systems related to odd numbered lines and even numbered lines respectively, and the PB signal and the PR signal of each signal system are converted into line sequential color signals which are time-compressed.

A TCI signal is obtained as such that the time-compressed PB and PR signals and the Y which is also time-compressed are time-multiplexed. Thus obtained TCI signal is recorded and reproduced.

The magnetic recording and reproducing apparatus according to the third embodiment comprises the time (axis) emphasis circuit for emphasizing in the time axis direction the high frequency components relative to the low frequency components as described in the first and second embodiments and a vertical (axis) emphasis circuit for emphasizing high frequency components relative to the low frequency components in the vertical direction and a horizontal (axis) emphasis circuit for emphasizing high frequency components relative to the low frequency components in the horizontal direction. The apparatus further comprises a time (axis) de-emphasis circuit, a vertical (axis) de-emphasis circuit and a horizontal (axis) de-emphasis circuit which are complementary to the time emphasis circuit, the vertical emphasis circuit and the horizontal emphasis circuit respectively.

A recording system will be described first with reference to FIG. 10. The Y signal cc and the PB and PB signals dd and ee respectively transmitted through a transmission line (not shown) are supplied through A/D converters 109 to 111 to dividing circuit 121 by which these signals are separated to two signal systems to obtain a first group of Y, PB and PR signals 121a to 121c respectively and a second group of Y, PB and PR signals 121d to 121f respectively, the first and second groups of signals are respectively supplied to first and second recording signal processing circuits R1 and R2. Since the second recording signal processing circuit R2 is identical in construction and operation to the first recording signal processing circuit R1, details thereof are not shown in FIG. 10.

The first PB and PR signals 121b and 121c are supplied to a line sequential converter circuit 123 of the first recording signal processing circuit R1 in which they are converted into a first line sequential color signal 123a which is supplied to a time emphasis circuit TE 156. It should be noted that, in the line sequential converter circuit 123 of the first recording signal processing circuit R1, only the first PB signal is selected and, in a line sequential converter circuit in the second recording signal processing circuit R2, only the second PR signal is selected.

The first line sequential color signal 123a is linearly and/or non-linearly emphasized in time axis direction by means of the time axis emphasis circuit TE 156. An output signal 156a of the time axis emphasis circuit TE 156 is linearly and/or non-linearly emphasized by a vertical emphasis circuit VE 157 and then non-linearly emphasized horizontally by a horizontal non-linear emphasis circuit HNE 158. A resultant signal is supplied to one of inputs of the TCI converter circuit 122.

On the other hand, the first Y signal 121a is emphasized linearly and/or non-linearly in time axis by a time emphasis circuit TE 159. An output signal 159a of the time emphasis circuit 159 is combined with an output signal of an identical time emphasis circuit of the second recording signal processing circuit R2 by a vertical emphasis circuit 160 so that these output signals are arranged in the normal line sequence. The combined signal is vertically linearly and/or non-linearly emphasized and divided again by the vertical emphasis circuit 160 to odd numbered lines and even numbered lines, which are horizontally non-linearly emphasized by the horizontal non-linear emphasis circuit HNE 161 of the first recording signal processing circuit R1 and a horizontal non-linear emphasis circuit HNE of the second recording signal processing circuit R2. An output of the horizontal non-linear emphasis circuit 161 is supplied to the other input of the TCI converter circuit 122.

The reason for the common use of the vertical emphasis circuit 160 for processing the first and second Y signals 121a and 121d is that, due to the fact that the signals 121a to 121c related to the even numbered line are separated from the signals 121d to 121f related to the odd numbered line by the dividing circuit 121, the vertical emphasis of them must be performed after combining them. On the other hand, the reason for the separate provision of the vertical emphasis circuits for line sequential color signal in the respective first and second recording signal processing circuits R1 and R2 is that the output signal of the line sequential converter circuit of the first recording signal processing circuit R1 is a line sequential color signal related to the PB signal while the output signal of the line sequential converter circuit of the second recording signal processing circuit R2 is the line sequential color signal related to the PR signal.

After the output signal of the horizontal non-linear emphasis circuit HNE 158 related to the line sequential color signal and the output signal of the horizontal emphasis circuit HNE 161 related to the luminance signal are time-compressed by the TCI converter circuit 122 respectively, the output signals are time-multiplexed every 1 H, a resultant TCI signal is supplied through a D/A converter 124 to a horizontal linear emphasis circuit 125.

The horizontal linear emphasis circuit HME 125 emphasizes a level of horizontal high frequency components of the TCI signal relative to low frequency components thereof and an output of the horizontal linear emphasis circuit HME 125 is supplied to an FM modulator circuit 126. The FM modulator circuit 126 FM-modulates it with a predetermined deviation and the FM-modulated output signal is amplified by a recording amplifier (not shown) and recorded on a magnetic tape T through magnetic heads 101A and 101B.

In the recording system of this embodiment, the luminance signal and the chrominance signal are separately emphasized suitably for natures of the respective signals.

The reproducing system of this embodiment will be described with reference to FIG. 11. Since reproducing signal processing circuits P1 and P2 in FIG. 11 have an identical construction and operate similarly to each other, description of the second reproducing signal processing circuit will be omitted.

In FIG. 11, a signal reproduced from the magnetic tape T with the magnetic heads 101A and 101B is amplified by a pre-amplifier (not shown) and supplied to an FM demodulator circuit DE MOD 130 and the demodulated signal is supplied to a horizontal linear de-emphasis circuit HMD 131.

The horizontal linear de-emphasis circuit 131 which is complementary to the horizontal linear emphasis circuit 125 shown in FIG. 10 suppresses high frequency components generated in the tape/head system particularly, to obtain an output signal 131a. The output signal 131a is supplied to a timing generator circuit TG 133 and to a TCI inverse conversion circuit 134 through an A/D converter circuit 132. The timing generator 133 separates a synchronizing signal from the output signal 131a and produces, on the basis of the synchronizing signal, a control signal 133a such as clock signal and timing signals which are supplied to vertical de-emphasis circuits 163 and 166 and time (axis) de-emphasis circuits 164 and 167 respectively. It should be noted that the clock signal is produced from the synchronizing signal as a reference signal by means of a known PLL system.

On the other hand, the TCI inverting circuit 134 time-expands the compressed Y signal related to the reproduced TCI signal and the compressed line sequential color signal to obtain a first luminance signal 134a and a first line sequential color signal 134b which are supplied to horizontal non-linear de-emphasis circuits 165 and 162 respectively to non-linearly de-emphasize them horizontally.

An output signal 162a of the horizontal non-linear de-emphasis circuit 162 related to the first line sequential color signal 134b is linearly and/or non-linearly de-emphasized by the vertical de-emphasis circuit 163 and, after non-linearly de-emphasized in time axis by the time (axis) de-emphasis circuit 164, is supplied to the line sequential inverting circuit 135.

On the other hand, an output signal of the horizontal non-linear de-emphasis circuit HND 165 related to the first luminance signal 134a is combined with the signal supplied from the horizontal non-linear de-emphasis circuit HND in the second reproducing signal processing circuit P2 by a vertical de-emphasis circuit 166 which is common for these reproducing signal processing circuits and, after vertically linearly and/or non-linearly de-emphasized, the two signals are divided again by the vertical de-emphasis circuit 166. Then, it is linearly and/or non-linearly de-emphasized in time axis direction by a time (axis) de-emphasis circuit 167.

Two groups of the Y, PB and PB signals of which the original line sequence has been restored, and thus outputted from the first and second reproducing signal processing circuits P1 and P2, are fed to a combining circuit 136 having functions complementary to that of the dividing circuit 121. Accordingly, de-emphasized Y, PB and PR signals ff, gg and hh are outputted from the combining circuit 136 to unshown transmission line through D/A converters 146, 147 and 148.

The reason for the common use of the vertical de-emphasis circuit 166 is that, due to the fact that the signals 121a to 121c related to the even numbered lines are separated from the signals 121d to 121f related to the odd numbered lines by the dividing circuit 121, vertical de-emphasis of them must be performed after combining them. On the other hand, the reason for the separate provision of the vertical de-emphasis circuits for line sequential color signal in the respective first and second reproducing signal processing circuits P1 and P2 is that the line sequential color signal of the first reproducing signal processing circuit P1 is a signal related to the PB signal while the output signal of the second recording signal processing circuit R2 is the signal related to the PR signal.

In the magnetic reproducing system of this embodiment, the luminance signal and the chrominance signal are separately de-emphasized suitably for natures of the respective signals.

Further, in this embodiment, the horizontal de-emphasis is first performed, then the vertical de-emphasis is performed and, thereafter, the time (axis) de-emphasis is performed. Therefore, it is possible to perform the vertical de-emphasis and the time de-emphasis by using the control signal produced on the basis of the output resulting from the horizontal de-emphasis, whose noise of high frequency component generated in the transmission line is suppressed to some extent, so that the de-emphasis processing can be done precisely without error.

Further, by applying the time (axis) de-emphasis circuit described with respect to the first and second embodiments to the third embodiment, it is possible to reproduce an image in the special reproduction mode such as still, frame advance and/or slow motion mode always stably without residual image and/or blur.

It is possible to make the vertical linear emphasis circuit 125 capable of performing a horizontal non-linear emphasis additionally, in this case, the horizontal non-linear emphasis circuits 158 and 161 in the stage preceding thereto can be eliminated. Further, it is also possible to make the horizontal linear de-emphasis circuit 131 capable of performing a horizontal non-linear de-emphasis, in this case, the horizontal non-linear de-emphasis circuits 162 and 165 in the succeeding stage thereto can be eliminated.

What is claimed is:

1. A video signal reproducing apparatus for performing a special reproduction which includes a repeated display of the same picture, said apparatus comprising:

a de-emphasis circuit including a memory, for de-emphasizing a video signal which is pre-emphasized of a level of high frequency components in a time domain relatively to low frequency components thereof, and reproducing operation performing means operating in said special reproduction for alternately repeating the steps of interrupting a de-emphasis process of said de-emphasis circuit upon completion of the de-emphasis process for one video signal image period, subsequently holding a content of said memory without refreshing said content, and performing the de-emphasis process using said content of said memory in a subsequent video signal image period.

2. A video signal reproducing apparatus for performing a special reproduction which includes a repeated display of the same picture, said apparatus comprising:

a de-emphasis circuit including a first memory, for de-emphasizing a video signal which is pre-emphasized of a level of high frequency components in a time domain relatively to low frequency components thereof, a second memory for storing a de-emphasized video signal from said de-emphasis circuit for one video image signal period, a switch for selectively outputting an output of said de-emphasis circuit and an output of said second memory, and special reproducing operation performing means operating in said special reproduction for alternately repeating the steps of interrupting a de-emphasis process of said de-emphasis circuit upon completion of the de-emphasis process for one video signal image period, subsequently holding a content of said first memory without refreshing said content, and switching said switch to output a first reproduced video signal written in said second memory during said one video image signal period and switching said switch to output a second reproduced video signal from said de-emphasis circuit during the de-emphasis process of said one video image signal period.

3. A method for improving the picture quality of a reproduced signal from a video signal reproducing apparatus for performing a special reproduction which includes a repeated display of the same picture, said apparatus comprising a de-emphasis circuit including a memory, for de-emphasizing a video signal which is pre-emphasized of a level of high frequency components in a time domain relatively to low frequency components thereof, said method including:

a reproducing operation of alternately repeating the steps of interrupting a de-emphasis process of said de-emphasis circuit upon completion of the de-emphasis process for one video signal image period, subsequently holding a content of said memory without refreshing said content in said special reproduction, and performing the de-emphasis process using said content of said memory in a subsequent video signal image period.

* * * * *